United States Patent [19]

McLoughlin et al.

[11] 4,107,408

[45] Aug. 15, 1978

[54] ACRYLONITRILE COPOLYMERS FOR CARBON FIBERS

[75] Inventors: Victor Conrad Richard McLoughlin, Farnborough; Roger Moreton, Aldershot; William Watt, Farnborough, all of England

[73] Assignee: National Research Development Corporation, London, England

[21] Appl. No.: 735,122

[22] Filed: Oct. 22, 1976

[30] Foreign Application Priority Data

Oct. 24, 1975 [GB] United Kingdom ............... 43828/75

[51] Int. Cl.$^2$ .......................................... C08F 220/44
[52] U.S. Cl. ................................. 526/8; 260/29.6 AB; 423/447.2; 423/447.3; 423/447.6; 423/447.7; 526/9; 526/10
[58] Field of Search ........................................ 526/8, 9

[56] References Cited

U.S. PATENT DOCUMENTS

| | | | |
|---|---|---|---|
| 2,332,899 | 10/1943 | D'Alelio | 174/125 |
| 2,566,255 | 8/1951 | Smith et al. | 260/85.5 |
| 2,569,470 | 9/1951 | Hagemeyer et al. | 260/45.5 |
| 3,388,199 | 6/1968 | Chaney et al. | 264/182 |

Primary Examiner—Stanford M. Levin
Attorney, Agent, or Firm—Cushman, Darby & Cushman

[57] ABSTRACT

A suitable precursor for the production of carbon fibre is an acrylonitrile copolymer containing at least one non-acrylic moiety which is a carbonyl group a hydroxymethylene group, —CH(OH)— or a two carbon moiety containing a carbonyl group or a hydroxymethylene group and in which the non-acrylonitrile moiety is present to the extent of 5 to 15 molar parts per 100 molar parts of acrylonitrile moiety.

The preparation of such copolymers and their conversion to carbon fibre is described.

3 Claims, No Drawings

ACRYLONITRILE COPOLYMERS FOR CARBON FIBERS

The invention relates to organic polymeric materials and to further treatment thereof.

Processes for the production of carbon fibres from organic polymeric materials are known, for example UK Specification No. 1,110,791 discloses a process for the conversion of polyacrylonitrile based fibre to carbon fibre by heating the polymer fibres at a temperature in the range 200°–250° C in an oxidising atmosphere followed by carbonisation in an inert atmosphere at a temperature of at least about 1000° C and wherein the fibre is subjected to tension at least at some stage in its conversion and normally during the oxidation stage. The process disclosed contemplates further heat treatment at temperatures up to 3000° C. The stages of oxygen treatment, carbonisation and further heat treatment may be separate, or the fibres may be passed as a continuous tow from one furnace to another at the appropriate temperatures.

The oxygen treatment is normally fairly lengthy in order to ensure an adequate degree of reaction between oxygen and the fibre. The time required at any given temperature increases quite sharply with the diameter of the fibre as the reaction is diffusion controlled. For example a 13μm polyacrylonitrile based fibre oxidised in air at 220° C will require approx 5 hours for the oxygen treatment stage. With polyacrylonitrile based polymers, if this stage is of too short a duration, the fibres may be left with a soft core and, on subsequent high temperature treatment, holes may be formed in the resulting fibres reducing the strength of the carbon fibres produced.

In the preparation of carbon fibres the oxygen treatment stage is an expensive one due mainly to the length of time required for the treatment. Also as this time increases with the diameter of the fibre the oxygen treatment stage may place a practical limitation upon the diameter of carbon fibre that can be produced. It is an object of the present invention to provide precursor materials which when used in the preparation of carbon fibre, enable the oxygen treatment step to be either reduced in time or eliminated without introducing a significant deterioration in the properties of the carbon fibres so produced.

According to the present invention there is provided an acrylonitrile copolymer suitable for use as a precursor in the production of carbon fibres wherein the acrylonitrile copolymer contains at least one nonacrylonitrile moiety which is a carbonyl group, a hydroxymethylene group (—CH(OH)—) or a two carbon moiety containing a carbonyl group or a hydroxymethylene, the non-acrylonitrile moiety being present to the extent of 5 to 16 molar parts per 100 molar parts of acrylonitrile moiety.

The copolymer may also contain other non-acrylonitrile moieties up to 5 molar parts per 100 molar parts of acrylonitrile. For example, methyl acrylate or methacrylate may be included to improve spinning properties of fibres produced from the copolymers.

Advantageously the non-acrylonitrile moiety is vinyl alcohol or oxoethylene and preferably is present to the extent of 12½ molar parts per 100 molar parts of acrylonitrile moiety. The said non-acrylonitrile moiety may be distributed at regular intervals or alternatively may be distributed substantially at random along the backbone of the said copolymer. The preparation of the copolymers may be made by any suitable chemical means. Conveniently acrylonitrile/vinyl alcohol copolymers are made by the copolymerisation of tertiary butyl vinyl ether with acrylonitrile and the tertiarybutoxy group subsequently hydrolysed from the copolymer by, for example, the addition of a strong mineral acid such as aqueous hydrobromic acid. The acrylonitrile/oxoethylene copolymer may be prepared by oxidising an acrylonitrile/vinyl alcohol copolymer using a suitable oxidising agent such as dimethyl sulphoxide/acetic anhydride.

In an aspect of the present invention there is provided a process for the preparation of carbon fibre from organic polymeric precursor fibre which includes the steps of heating the fibre to a temperature in the range 200° to 400° C in an inert atmosphere while the natural shrinkage of the fibre is at least restrained followed by heat treatment in the temperature range 800° C or above in an inert atmosphere and wherein the organic polymeric precursor fibre is a copolymer of acrylonitrile in which the non-acrylonitrile moiety is a carbonyl group, a hydroxymethylene group or a two carbon moiety containing a carbonyl group or a hydroxymethylene group and in which the non-acrylonitrile moiety is present to the extent of 5 to 16 molar parts per 100 molar parts of acrylonitrile. Preferably the non-acrylonitrile moiety is vinyl alcohol or oxoethylene and in a preferred embodiment is present to the extent of 12½ molar parts per 100 molar parts of acrylonitrile.

Copolymers used in this aspect of the present invention may contain other non-acrylonitrile moieties up to 5 molar parts per 100 molar parts of acrylonitrile.

In a further aspect of the present invention the organic polymeric precursor above defined is subjected to an oxygen treatment step at a temperature in the range 200°–250° C while the natural shrinkage of the fibre is at least restrained followed by heat in the temperature range 800° C or above in an inert atmosphere.

It is believed, though this should not be considered as placing any limitation upon the present invention, that the presence of a carbonyl or a hydroxymethylene group in the backbone of the acrylonitrile copolymer acts to promote cross-linking of the acrylonitrile moiety during heat treatment of the fibre enabling the oxygen treatment stage to be reduced or eliminated. The ability to reduce or to eliminate the oxygen treatment stage results in a simpler and cheaper method of production and allows large diameter carbon fibres to be produced economically. For example the use of an acrylonitrile copolymer containing 12½ molar parts of oxoethylene per 100 mol parts of acrylonitrile produced carbon fibres having a comparable strength to carbon fibres produced from a polyacrylonitrile precursor whilst allowing the time required for the oxygen treatment step to be reduced by a factor of five.

In this specification the term inherent viscosity is defined as the quantity $(Log_e Z_r)/C$ where $Z_r$ is the ratio of the time for a polymer solution of concentration Cg/dl to flow through a viscometer to the time taken for the solvent alone to flow through the same viscometer and unless otherwise specified refers to measurements taken on a 0.5% W/V solution of the polymer in dimethyl formamide solvent at 25° C.

The invention will now be described, by way of example only, with reference to the following examples.

EXAMPLE 1

A copolymer of acrylonitrile/oxoethylene containing 12½ moles of oxoethylene per 100 moles of acrylonitrile was prepared by (a) copolymerising a mixture of acrylonitrile and tertiarybutyl vinyl ether dissolved in dimethyl sulphoxide solvent using azobisisobutyronitrile as an initiator to form an acrylonitrile/butoxyethylene copolymer, (b) dissolving the copolymer in an aqueous solution of sodium thiocyanate and hydrolysing the tertiarybutoxy grouping with hydrobromic acid to form an acrylonitrilehydroxyethylene copolymer and (c) oxidising this copolymer with dimethyl sulphoxide/acetic anhydride to form the acrylonitrileoxoethylene copolymer. The experimental details are as follows:

a. A solution was made containing acrylonitrile (18.9 g), tertiary butyl vinyl ether (2.48 g) and dimethyl sulphoxide (100 mls). To this solution was added 170 mg of azobisisobutyronitrile and the solution heated at 50° for 105 min under nitrogen (the solution remained clear at all times). The solution, which was by now viscous, was then added dropwise into methanol (500 mls) with stirring to precipitate the copolymer which was filtered, washed with methanol and dried. The yield was 6.35 g of a white solid having the approximate composition $O_{30}H_{36}N_8O$ and an inherent viscosity of 1.8 dl/g.

b. This copolymer (3.9g) was dissolved in a 50% W/W aqueous solution of sodium thiocyanate with stirring at 20° C. To the solution was slowly added 1.25 mls of 48% W/W aqueous hydrobromic acid and the solution stirred for 2 hours at 20° C. The solution was then slowly added to a large volume of water and the resultant white precipitate filtered, washed and dried. The white solid produced had a composition of approximately $C_{26}H_{28}N_8O$ and an inherent viscosity of 2.15 dl/g.

c. A solution of the resultant solid (3.4 g) in dimethyl sulphoxide (360 ml) was treated with acetic acid anhydride (18 ml) with stirring. After 18 hours at 20° C, the product was precipitated into water (4 l) to give a white copolymer having an approximate formula of $C_{26}H_{26}N_8O$ and an inherent viscosity of 1.9 dl/g.

The copolymer of inherent viscosity described in (c) was converted to fibres by passing an 8% W/W solution of the polymer in a 50% W/W solution of aqueous sodium thiocyanate through a spinnerette into a coagulation bath of 10% W/W aqueous sodium thiocyanate solution. The resultant fibres were then washed by passing them through a bath of distilled water and were steam stretched by a factor of 11.

A sample of the fibre was then converted to carbon fibre by heating in a nitrogen atmosphere, initially at 400° C for 6 hours and finally at 1000° C for ½ hour. During the heating the fibre was wound onto silica frames to restrain shrinkage of the fibres. The carbon fibres produced were then removed from the frames and a portion of these subjected to a further heat treatment in an argon atmosphere at 2500° C for ½ hour.

As a control, a batch of 'Courtelle' fibre was also converted to carbon fibre in the manner described above.

Also as a control, a second batch of 'Courtelle' fibre was converted to carbon fibre by heating the fibres initially at 220° C in air for 5 hours and finally at 1000° C for ½ hour in nitrogen. The heat treatment in air served as an oxygen treatment step. During both heating steps the fibres were wound onto silica frames in such a manner as to restrain shrinkage of the fibres. As before a portion of the carbon fibres produced was removed from the frames and subjected to a further heat treatment in argon at 2500° C for ½ hour.

'Courtelle' fibre is a commercially available polyacrylonitrile based fibre sold by Courtaulds Ltd containing about 6 mole per cent of methyl acrylate. Courtelle is a Registered Trade Mark.

The properties of the fibres produced in the experiments are shown in Table 1.

TABLE 1

| | 'Courtelle' | | Acrylonitrile/oxoethylene |
|---|---|---|---|
| Properties of original fibre as spun | | | |
| fibre diameter μm | 12.8 | | 17.1 |
| modulus 10⁶ psi | 1.5 | | 1.5 |
| ultimate tensile strength 10³ psi | 92 | | 75 |
| Properties of fibre after carbonisation to 1000° C | Without oxygen permeation step | with oxygen permeation step | |
| fibre diameter μm | 7.7 | 8.4 | 8.2 |
| Modulus 10⁶ psi | 16 | 26 | 23 |
| ultimate tensile strength 10³ psi | 128 | 295 | 218 |
| Properties of fibres after further heat treatment up to 2500° C | | | |
| fibre diameter μm | 6.3 | 7.4 | 7.7 |
| modulus 10⁶ psi | 33 | 54 | 42 |
| ultimate tensile strength 10³ psi | 173 | 290 | 105 |

As may be seen from Table 1 the properties of the carbon fibres produced from the acrylonitrile/oxoethylene copolymer are intermediate between fibres prepared from 'Courtelle' fibres with and without the inclusion of an oxygen treatment step. Although the properties of the fibres are not as good as those produced from 'Courtelle' fibre using the oxygen treatment stage described above prior to carbonisation the fibres still have useful properties and as such will find many applications. The main advantage of using the copolymer is the ability to produce fibres having useful properties without the need for the use of the time consuming and therefore expensive oxygen treatment stage. Although in the present example the fibres were heated to a temperature of 400° C for 6 hours prior to carbonisation this step may be omitted without detriment to the properties of the fibre. Restraining the shrinkage of the fibres during initial heating to 400° C is however believed to be necessary to obtain fibres having these properties.

The effect of a limited oxygen treatment stage on the copolymer fibres of the present invention was then investigated. Carbon fibres were prepared from the copolymer as indicated above except that an oxygen treatment was introduced prior to carbonisation. The oxygen treatment stage consisted of heating the fibres in air for one hour at 220° C whilst they were held on silica frames to restrain shrinkage of the fibres. Carbon fibres produced by this method gave the same modulus and yield as the oxygen treated 'Courtelle' even though the oxidation time had been reduced by 4 hours or by 80%.

EXAMPLE 2

An acrylonitrile/hydroxyethylene copolymer containing 8⅓ moles of hydroxyethylene per 100 mols of acrylonitrile was prepared by a method as described in (a) and (b) of Example 1. The copolymer was then spun into fibres again as indicated in Example 1 except that the spinning solution was a 12% W/W solution of the copolymer in a 50% W/W solution of aqueous sodium thiocyanate and the fibres were steam stretched by a factor of 14. The fibres were then converted to carbon fibres again as indicated in Example 1. The results are shown in Table 2.

TABLE 2

| Properties of fibre | Diameter μm | Youngs Modulus $10^6$ psi | Ultimate tensile strength $10^3$ psi |
| --- | --- | --- | --- |
| As spun | 14.6 | 2.1 | 92 |
| After carbonisation at 1000° C | 7.5 | 21 | 164 |
| After further heat treatment to 2500° C | 7.0 | 38 | 156 |

As may be seen from Table 2 the carbon fibres have properties intermediate between those produced from the Courtelle fibre with and without an oxygen treatment stage.

What we claimed is:

1. An acrylonitrile copolymer suitable for use as a precursor in the production of carbon fibers which copolymer contains at least one non-acrylonitrile moiety selected from a carbonyl group and two carbon moieties containing a carbonyl group in the polymer backbone, the non-acrylonitrile moiety being present to the extent of about 5 to about 16 molar parts per 100 molar parts of acrylonitrile moiety.

2. An acrylonitrile copolymers as claimed in claim 1 wherein the non-acrylonitrile moiety is present to the extent of about 12.5 molar parts per 100 molar parts of acrylonitrile moiety.

3. An acrylonitrile based copolymer as claimed in claim 1 also including at least one further non-acrylonitrile moiety to the total extent of up to 5 molar parts per 100 molar parts of acrylonitrile.

* * * * *